(12) United States Patent
Oda et al.

(10) Patent No.: US 8,125,547 B2
(45) Date of Patent: Feb. 28, 2012

(54) DRIVING METHOD OF SOLID-STATE IMAGING DEVICE, SOLID-STATE IMAGING DEVICE, AND IMAGING APPARATUS INCLUDING PHOTOELECTRIC CONVERSION ELEMENTS FOR LUMINANCE DETECTION

(75) Inventors: Kazuya Oda, Miyagi (JP); Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 591 days.

(21) Appl. No.: 12/273,968

(22) Filed: Nov. 19, 2008

(65) Prior Publication Data
US 2009/0135281 A1 May 28, 2009

(30) Foreign Application Priority Data
Nov. 22, 2007 (JP) ................ P2007-302758

(51) Int. Cl.
H04N 5/235 (2006.01)
H04N 9/68 (2006.01)
H04N 3/14 (2006.01)
H04N 5/335 (2011.01)
H04N 9/04 (2006.01)

(52) U.S. Cl. ............. 348/277; 348/230.1; 348/236; 348/275; 348/281

(58) Field of Classification Search ........... 348/216.1, 348/230.1, 234, 236, 273, 275, 276, 277, 348/279, 280, 281, 282, 302, 308, 311
See application file for complete search history.

(56) References Cited

U.S. PATENT DOCUMENTS

| | | | | |
|---|---|---|---|---|
| 7,839,437 | B2 * | 11/2010 | Kasai et al. | 348/273 |
| 7,880,785 | B2 * | 2/2011 | Gallagher | 348/276 |
| 2006/0055800 | A1 * | 3/2006 | Ackland et al. | 348/308 |
| 2006/0139468 | A1 * | 6/2006 | Wada | 348/272 |
| 2008/0297633 | A1 * | 12/2008 | Wada | 348/272 |
| 2008/0316326 | A1 * | 12/2008 | Wada | 348/311 |
| 2009/0009637 | A1 * | 1/2009 | Wada | 348/241 |
| 2009/0015693 | A1 * | 1/2009 | Wada | 348/234 |
| 2009/0040353 | A1 * | 2/2009 | Yamamoto | 348/308 |
| 2009/0213256 | A1 * | 8/2009 | Kudoh | 348/302 |
| 2010/0141812 | A1 * | 6/2010 | Hirota | 348/279 |
| 2011/0063482 | A1 * | 3/2011 | Kim et al. | 348/273 |

FOREIGN PATENT DOCUMENTS

JP  11-355790 A  12/1999
JP  2003318375 A * 11/2003

OTHER PUBLICATIONS

Translation of Japanese Publ. No. 11-355790A; Publ. date—Dec. 24, 1999.*

* cited by examiner

*Primary Examiner* — John Villecco
(74) *Attorney, Agent, or Firm* — Birch, Stewart, Kolasch & Birch, LLP

(57) ABSTRACT

A driving method of a solid-state imaging device including a plurality of photoelectric conversion elements as defined herein, includes performing first driving which mixes a first electric charge generated in the first photoelectric conversion element with a second electric charge generated in the photoelectric conversion element for luminance detection, converts the electric charges obtained by the mixing into a signal, and outputs the signal.

2 Claims, 7 Drawing Sheets

DRIVING METHOD OF SOLID-STATE IMAGING DEVICE, SOLID-STATE IMAGING DEVICE, AND IMAGING APPARATUS INCLUDING PHOTOELECTRIC CONVERSION ELEMENTS FOR LUMINANCE DETECTION

CROSS-REFERENCE TO RELATED APPLICATIONS

This application claims the benefit of Japanese Patent Application JP 2007-302758, filed Nov. 22, 2007, the entire content of which is hereby incorporated by reference, the same as if set forth at length.

FIELD OF THE INVENTION

The present invention relates to a driving method of a solid-state imaging device for driving a solid-state imaging device having a plurality of photoelectric conversion elements.

BACKGROUND OF THE INVENTION

JP-A-11-355790 discloses an imaging device in which a first photosensitive element group, in which photosensitive elements that detect a luminance component of light are arrayed in a square lattice pattern, and a second photosensitive element group, in which photosensitive elements that detect a color component of light are arrayed in a square lattice pattern, are positioned adjacent to each other on a silicon substrate so as to be shifted from each other, that is, a so-called honeycomb arrangement pattern is formed.

SUMMARY OF THE INVENTION

The invention proposes an effective driving method of a solid-state imaging device having a photosensitive element that detects a luminance component and a photosensitive element that detects a color component, as disclosed in JP-A-11-355790.

According to an aspect of the invention, a driving method of a solid-state imaging device for driving a solid-state imaging device having a plurality of photoelectric conversion elements includes: performing first driving for mixing a first electric charge generated in a first photoelectric conversion element, which is the photoelectric conversion element in which a color filter allowing green light to be transmitted therethrough is provided above a light receiving surface, with a second electric charge generated in a photoelectric conversion element for luminance detection adjacent to the first photoelectric conversion element in a predetermined direction of the first photoelectric conversion element, converting the electric charges obtained by the mixing into a signal, and outputting the signal. The plurality of photoelectric conversion elements include a first photoelectric conversion element group arrayed in a square lattice pattern in a row direction and a column direction perpendicular to the row direction and a second photoelectric conversion element group arrayed in a square lattice pattern similar to the first photoelectric conversion element group. The first photoelectric conversion element group and the second photoelectric conversion element group are disposed to be shifted by ½ of an arrangement pitch of the photoelectric conversion elements in the row direction and the column direction. The first photoelectric conversion element group is configured to include three kinds of photoelectric conversion elements in which color filters allowing light components corresponding to three colors including a green color to be transmitted therethrough are provided above the light receiving surface. The second photoelectric conversion element group is configured to include only the photoelectric conversion element for luminance detection in which a luminance filter related with a luminance component is provided above the light receiving surface.

In the driving method of a solid-state imaging device according to the aspect of the invention, the solid-state imaging device may include a charge transfer path, which is provided corresponding to a photoelectric conversion element column including the photoelectric conversion elements arrayed in the column direction so as to be positioned next to the photoelectric conversion element column and which is used to transfer an electric charge in the column direction, and an output portion that outputs a signal corresponding to the electric charge transmitted through the charge transfer path. A charge read portion for reading an electric charge generated in the photoelectric conversion element to the charge transfer path may be formed between each of the plurality of photoelectric conversion elements and the charge transfer path adjacent to each of the plurality of photoelectric conversion elements so as to correspond to the photoelectric conversion element. The charge read portion corresponding to the first photoelectric conversion element and the charge read portion corresponding to the photoelectric conversion element for luminance detection adjacent to the first photoelectric conversion element in the predetermined direction of the first photoelectric conversion element may be formed adjacent to the same charge transfer path. The first driving may be driving for reading electric charges from the first photoelectric conversion element and the photoelectric conversion element for luminance detection to the charge transfer path, mixing the electric charges on the charge transfer path, and outputting a signal corresponding to the mixed electric charges from the output portion.

In the driving method of a solid-state imaging device according to the aspect of the invention, the charge read portion corresponding to each of the two kinds of photoelectric conversion elements excluding the first photoelectric conversion element of the three kinds of photoelectric conversion elements may be formed adjacent to charge transfer path other than the charge transfer path (hereinafter, referred to as a first charge transfer path) to which the charge read portion corresponding to the first photoelectric conversion element is adjacent. Only the charge read portion corresponding to one of the two kinds of photoelectric conversion elements may be adjacent to the charge transfer path (hereinafter, referred to as a second charge transfer path) to which the charge read portion corresponding to one of the two kinds of photoelectric conversion elements is adjacent. Only the charge read portion corresponding to the other one of the two kinds of photoelectric conversion elements may be adjacent to the charge transfer path (hereinafter, referred to as a third charge transfer path) to which the charge read portion corresponding to the other one of the two kinds of photoelectric conversion elements is adjacent. The driving method may further include performing second driving for reading an electric charge from the first photoelectric conversion element to the first charge transfer path, reading an electric charge from the one of the two kinds of photoelectric conversion elements to the second charge transfer path, reading an electric charge from the other one of the two kinds of photoelectric conversion elements to the third charge transfer path, transferring the read electric charges to an output amplifier, and outputting a signal corresponding to the electric charges from the output amplifier.

In the driving method of a solid-state imaging device according to the aspect of the invention, the solid-state imaging device may include a charge storage portion, which is provided corresponding to each of the plurality of photoelectric conversion elements and temporarily stores an electric charge generated and stored in each of the plurality of photoelectric conversion elements, and a signal output circuit formed of a MOS transistor that outputs a signal corresponding to the electric charge stored in the charge storage portion. The charge storage portion corresponding to the first photoelectric conversion element and the charge storage portion corresponding to the photoelectric conversion element for luminance detection adjacent to the first photoelectric conversion element in the predetermined direction of the first photoelectric conversion element may be shared. The solid-state imaging device may include a first transfer control unit for controlling transfer of an electric charge from the first photoelectric conversion element to the charge storage portion and a second transfer control unit for controlling transfer of an electric charge from the photoelectric conversion element for luminance detection to the charge storage portion. The first driving may be driving for transferring an electric charge from the first photoelectric conversion element to the charge storage portion by controlling the first transfer control unit, transferring an electric charge from the photoelectric conversion element for luminance detection to the charge storage portion by controlling the second transfer control unit, mixing the electric charges in the charge storage portion, and then outputting a signal corresponding to the mixed electric charges from the signal output circuit.

In the driving method of a solid-state imaging device according to the aspect of the invention, three colors including the green color may be primary colors, and an arrangement of the color filters may be a Bayer arrangement.

According to another aspect of the invention, a solid-state imaging device having a plurality of photoelectric conversion elements includes: a charge transfer path, which is provided corresponding to a photoelectric conversion element column including the photoelectric conversion elements arrayed in a column direction so as to be positioned next to the photoelectric conversion element column and which is used to transfer an electric charge in the column direction; and an output portion that outputs a signal corresponding to the electric charge transmitted through the charge transfer path. The plurality of photoelectric conversion elements include a first photoelectric conversion element group arrayed in a square lattice pattern in a row direction and a column direction perpendicular to the row direction and a second photoelectric conversion element group arrayed in a square lattice pattern similar to the first photoelectric conversion element group. The first photoelectric conversion element group and the second photoelectric conversion element group are disposed to be shifted by ½ of an arrangement pitch of the photoelectric conversion elements in the row direction and the column direction. The first photoelectric conversion element group is configured to include three kinds of photoelectric conversion elements in which color filters allowing light components corresponding to three colors including a green color to be transmitted therethrough are provided above a light receiving surface. The second photoelectric conversion element group is configured to include only a photoelectric conversion element for luminance detection in which a luminance filter correlated with a luminance component is provided above the light receiving surface. A charge read portion for reading an electric charge generated in the photoelectric conversion element to the charge transfer path is formed between each of the plurality of photoelectric conversion elements and the charge transfer path adjacent to each of the plurality of photoelectric conversion elements so as to correspond to the photoelectric conversion element. The charge read portion corresponding to a first photoelectric conversion element, which is the photoelectric conversion element in which a color filter allowing green light to be transmitted therethrough is provided above the light receiving surface, and the charge read portion corresponding to the photoelectric conversion element for luminance detection adjacent to the first photoelectric conversion element in a predetermined direction of the first photoelectric conversion element are formed adjacent to the same charge transfer path.

In the solid-state imaging device according to the aspect of the invention, the charge read portion corresponding to each of the two kinds of photoelectric conversion elements excluding the first photoelectric conversion element of the three kinds of photoelectric conversion elements may be provided adjacent to a charge transfer path other than the charge transfer path to which the charge read portion corresponding to the first photoelectric conversion element is adjacent. Only the charge read portion may be adjacent to the charge transfer path to which the charge read portion corresponding to one of the two kinds of photoelectric conversion elements is adjacent. Only the charge read portion may be adjacent to the charge transfer path to which the charge read portion corresponding to the other one of the two kinds of photoelectric conversion elements is adjacent.

According to still another aspect of the invention, a solid-state imaging device having a plurality of photoelectric conversion elements includes: a charge storage portion, which is provided corresponding to each of the plurality of photoelectric conversion elements and which temporarily stores an electric charge generated and stored in each of the plurality of photoelectric conversion elements; and a signal output circuit formed of a MOS transistor that outputs a signal corresponding to the electric charge stored in the charge storage portion. The plurality of photoelectric conversion elements include a first photoelectric conversion element group arrayed in a square lattice pattern in a row direction and a column direction perpendicular to the row direction and a second photoelectric conversion element group arrayed in a square lattice pattern similar to the first photoelectric conversion element group. The first photoelectric conversion element group and the second photoelectric conversion element group are disposed to be shifted by ½ of an arrangement pitch of the photoelectric conversion elements in the row direction and the column direction. The first photoelectric conversion element group is configured to include three kinds of photoelectric conversion elements in which color filters allowing light components corresponding to three colors including a green color to be transmitted therethrough are provided above a light receiving surface. The second photoelectric conversion element group is configured to include only a photoelectric conversion element for luminance detection in which a luminance filter correlated with a luminance component is provided above the light receiving surface. The charge storage portion corresponding to a first photoelectric conversion element, which is the photoelectric conversion element in which a color filter allowing green light to be transmitted therethrough is provided above the light receiving surface, and the charge storage portion corresponding to the photoelectric conversion element for luminance detection adjacent to the first photoelectric conversion element in a predetermined direction of the first photoelectric conversion element are shared. The first transfer control unit for controlling transfer of an electric charge from the first photoelectric conversion element to the charge storage portion and a second transfer control unit for controlling transfer of an electric charge from the photoelectric conversion element for luminance detection to the charge storage portion are further included.

In the solid-state imaging device according to the aspect of the invention, three colors including the green color may be primary colors, and an arrangement of the color filters may be a Bayer arrangement.

According to still another aspect of the invention, an imaging apparatus includes: a solid-state imaging device having a plurality of photoelectric conversion elements; and a first driving unit for performing first driving for mixing a first electric charge generated in a first photoelectric conversion element, which is the photoelectric conversion element in which a color filter allowing green light to be transmitted therethrough is provided above a light receiving surface, with a second electric charge generated in a photoelectric conversion element for luminance detection adjacent to the first photoelectric conversion element in a predetermined direction of the first photoelectric conversion element, converting the electric charges obtained by the mixing into a signal, and outputting the signal. The plurality of photoelectric conversion elements include a first photoelectric conversion element group arrayed in a square lattice pattern in a row direction and a column direction perpendicular to the row direction and a second photoelectric conversion element group arrayed in a square lattice pattern similar to the first photoelectric conversion element group. The first photoelectric conversion element group and the second photoelectric conversion element group are disposed to be shifted by ½ of an arrangement pitch of the photoelectric conversion elements in the row direction and the column direction. The first photoelectric conversion element group is configured to include three kinds of photoelectric conversion elements in which color filters allowing light components corresponding to three colors including a green color to be transmitted therethrough are provided above the light receiving surface. The second photoelectric conversion element group is configured to include only the photoelectric conversion element for luminance detection in which a luminance filter correlated with a luminance component is provided above the light receiving surface.

In the imaging apparatus according to the aspect of the invention, the solid-state imaging device may include a charge transfer path, which is provided corresponding to a photoelectric conversion element column including the photoelectric conversion elements arrayed in the column direction so as to be positioned next to the photoelectric conversion element column and which is used to transfer an electric charge in the column direction, and an output portion that outputs a signal corresponding to the electric charge transmitted through the charge transfer path. A charge read portion for reading an electric charge generated in the photoelectric conversion element to the charge transfer path may be formed between each of the plurality of photoelectric conversion elements and the charge transfer path adjacent to each of the plurality of photoelectric conversion elements so as to correspond to the photoelectric conversion element. The charge read portion corresponding to the first photoelectric conversion element and the charge read portion corresponding to the photoelectric conversion element for luminance detection adjacent to the first photoelectric conversion element in the predetermined direction of the first photoelectric conversion element may be formed adjacent to the same charge transfer path. The first driving may be driving for reading electric charges from the first photoelectric conversion element and the photoelectric conversion element for luminance detection to the charge transfer path, mixing the electric charges on the charge transfer path, and outputting a signal corresponding to the mixed electric charges from the output portion.

In the imaging apparatus according to the aspect of the invention, the charge read portion corresponding to each of the two kinds of photoelectric conversion elements excluding the first photoelectric conversion element of the three kinds of photoelectric conversion elements may be provided adjacent to a charge transfer path other than the charge transfer path (hereinafter, referred to as a first charge transfer path) to which the charge read portion corresponding to the first photoelectric conversion element is adjacent. Only the charge read portion corresponding to one of the two kinds of photoelectric conversion elements may be adjacent to the charge transfer path (hereinafter, referred to as a second charge transfer path) to which the charge read portion corresponding to one of the two kinds of photoelectric conversion elements is adjacent. Only the charge read portion corresponding to the other one of the two kinds of photoelectric conversion elements may be adjacent to the charge transfer path (hereinafter, referred to as a third charge transfer path) to which the charge read portion corresponding to the other one of the two kinds of photoelectric conversion elements is adjacent. A second driving unit for performing second driving for reading an electric charge from the first photoelectric conversion element to the first charge transfer path, reading an electric charge from the one of the two kinds of photoelectric conversion elements to the second charge transfer path, reading an electric charge from the other one of the two kinds of photoelectric conversion elements to the third charge transfer path, transferring the read electric charges to an output amplifier, and outputting a signal corresponding to the electric charges from the output amplifier may be further included.

In the imaging apparatus according to the aspect of the invention, the solid-state imaging device may include a charge storage portion, which is provided corresponding to each of the plurality of photoelectric conversion elements and temporarily stores an electric charge generated and stored in each of the plurality of photoelectric conversion elements, and a signal output circuit formed of a MOS transistor that outputs a signal corresponding to the electric charge stored in the charge storage portion. The charge storage portion corresponding to the first photoelectric conversion element and the charge storage portion corresponding to the photoelectric conversion element for luminance detection adjacent to the first photoelectric conversion element in the predetermined direction of the first photoelectric conversion element may be shared. The solid-state imaging device may include a first transfer control unit for controlling transfer of an electric charge from the first photoelectric conversion element to the charge storage portion and a second transfer control unit for controlling transfer of an electric charge from the photoelectric conversion element for luminance detection to the charge storage portion. The first driving may be driving for transferring an electric charge from the first photoelectric conversion element to the charge storage portion by controlling the first transfer control unit, transferring an electric charge from the photoelectric conversion element for luminance detection to the charge storage portion by controlling the second transfer control unit, mixing the electric charges in the charge storage portion, and then outputting a signal corresponding to the mixed electric charges from the signal output circuit.

In the imaging apparatus according to the aspect of the invention, three colors including the green color may be primary colors, and an arrangement of the color filters may be a Bayer arrangement.

According to the aspect of the invention, it is possible to provide an effective driving method of a solid-state imaging device comprising a photosensitive element that detects a luminance component and a photosensitive element that detects a color component.

DESCRIPTION OF REFERENCE NUMERALS AND SIGNS

Figure 1:
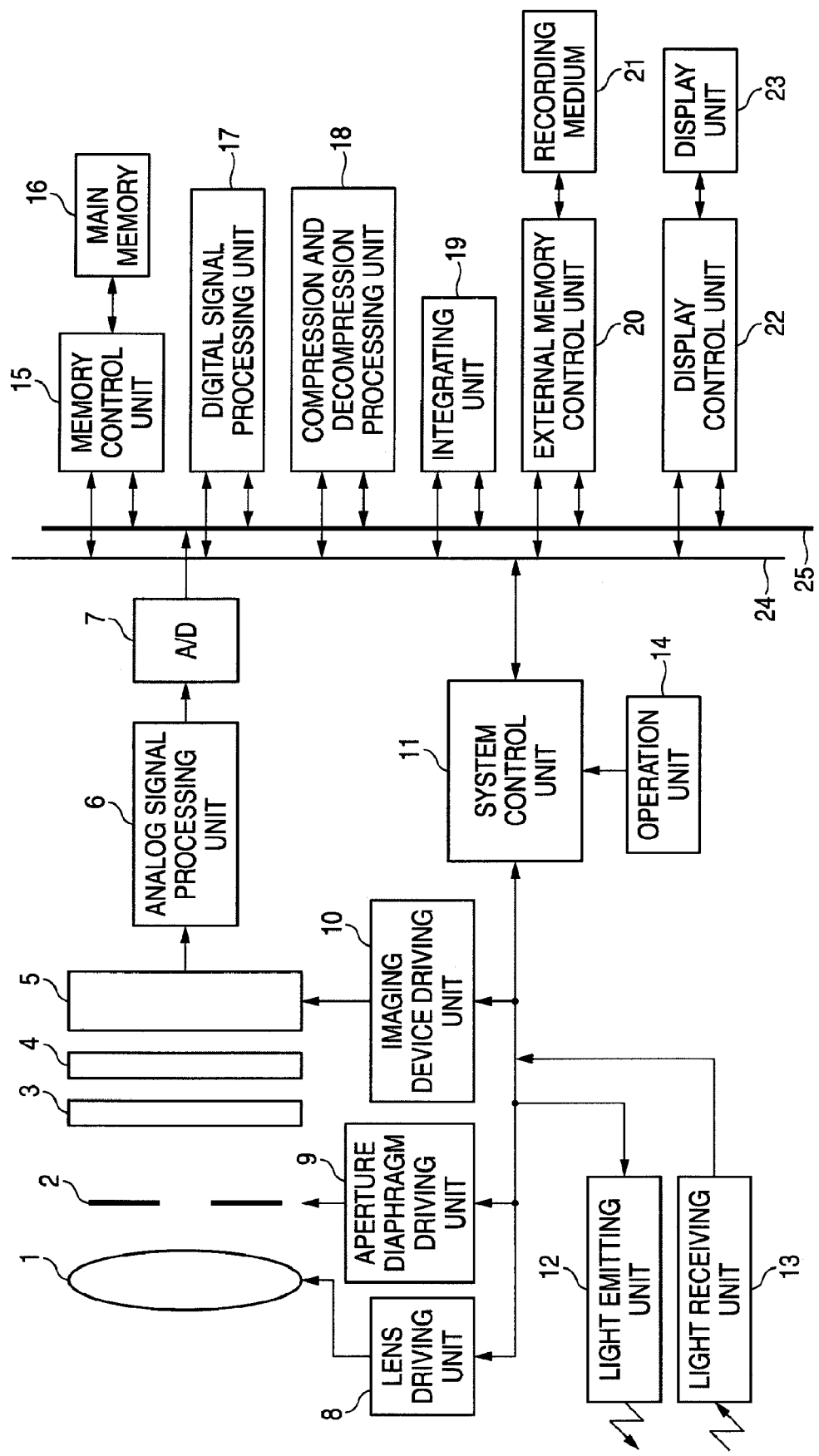
FIG. 1 is a block diagram illustrating the schematic configuration of a digital camera that is an example of an imaging apparatus for describing a first embodiment of the invention.

5: solid-state imaging device
10: imaging device driving unit
51R, 51G, 51B, 51W: photoelectric conversion element
54: vertical charge transfer path
55r, 55g, 55b, 55w: charge read portion
57: horizontal charge transfer path
58: output amplifier

DETAILED DESCRIPTION OF THE INVENTION

Hereinafter, embodiments of the invention will be described with reference to the accompanying drawings.

First Embodiment

FIG. 1 is a block diagram illustrating the schematic configuration of a digital camera that is an example of an imaging apparatus for describing a first embodiment of the invention.

An imaging system of the digital camera shown in FIG. 1 includes an imaging lens 1, a solid-state imaging device 5, an aperture diaphragm 2 provided between the imaging lens 1 and the solid-state imaging device 5, an infrared cut filter 3, and an optical low pass filter 4.

A system control unit 11 that makes an overall control of the entire electric control system of the digital camera controls a flash light emitting unit 12 and a light receiving unit 13, controls a lens driving unit 8 to adjust the position of the imaging lens 1 to a focusing position or to perform a zoom adjustment, or controls the aperture of the aperture diaphragm 2 through an aperture diaphragm driving unit 9 so as to adjust the amount of exposed light.

Moreover, the system control unit 11 drives the solid-state imaging device 5 through an imaging device driving unit 10 and outputs a photographic image, which is imaged through the imaging lens 1, as a color signal. A user's instruction signal is input to the system control unit 11 through an operation unit 14.

The electric control system of the digital camera further includes: an analog signal processing unit 6 that is connected to an output of the solid-state imaging device 5 and performs analog signal processing, such as correlation double sampling processing; and an A/D conversion circuit 7 that converts RGB color signals, which are output from the analog signal processing unit 6, into digital signals. The analog signal processing unit 6 and the A/D conversion circuit 7 are controlled by the system control unit 11.

In addition, the electric control system of the digital camera further includes: a main memory 16; a memory control unit 15 connected to the main memory 16; a digital signal processing unit 17 that performs an interpolating operation or a correction operation, RGB/YC conversion processing, and the like to generate image data; a compression and decompression processing unit 18 that compresses image data created by the digital signal processing unit 17 in a JPEG format or decompresses the compressed data; an integrating unit 19 that integrates photometric data and calculates a gain of white balance correction performed by the digital signal processing unit 17; an external memory control unit 20 to which a detachable recording medium 21 is connected; and a display control unit 22 connected with a liquid crystal display unit 23 mounted on a back surface of the camera. These are connected to one another by a control bus 24 and a data bus 25 and are controlled by an instruction from the system control unit 11.

Figure 2:
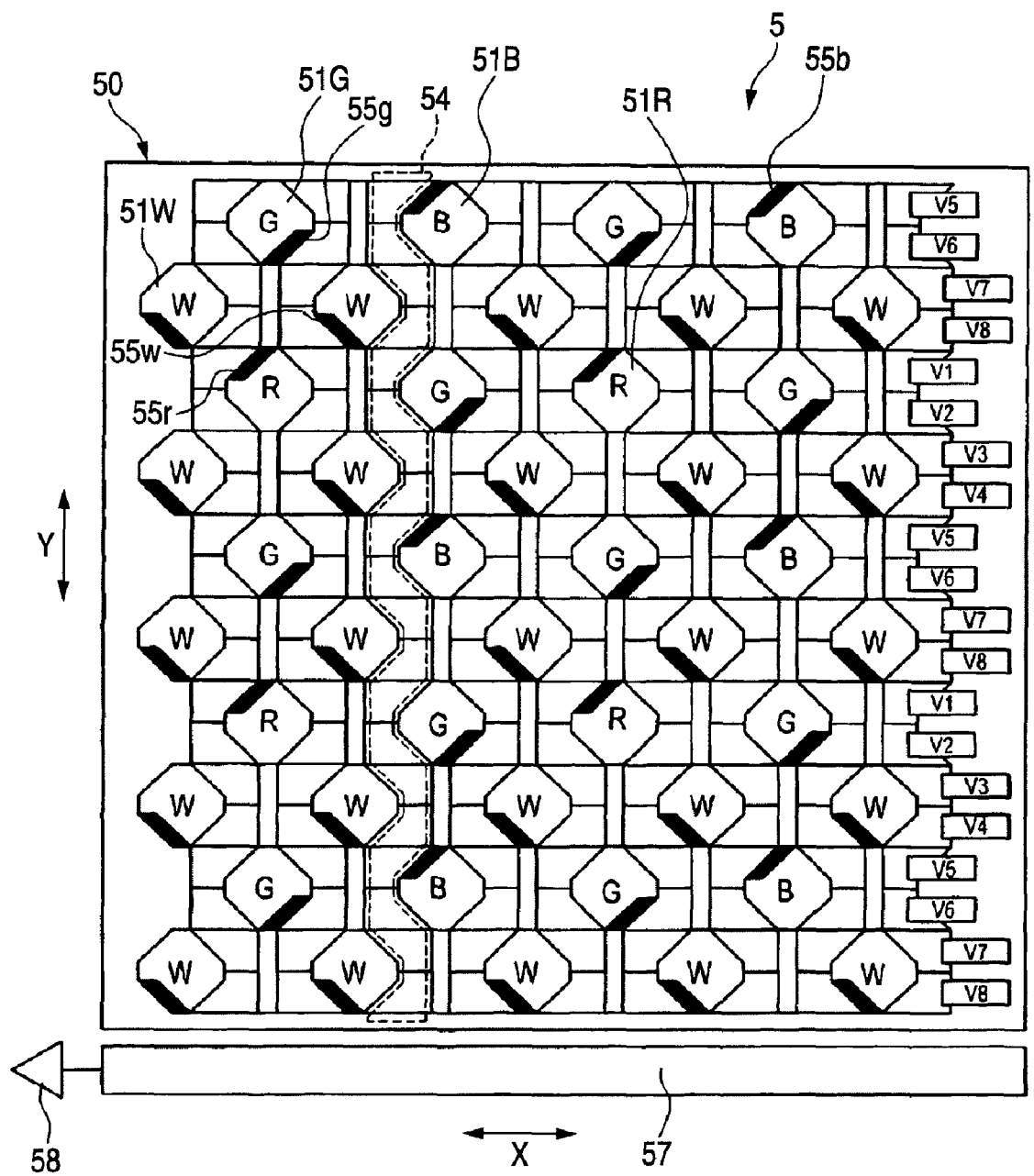
FIG. 2 is a plan view schematically illustrating an example of the configuration of a solid-state imaging device shown in FIG. 1.

FIG. 2 is a plan view schematically illustrating an example of the configuration of the solid-state imaging device 5 shown in FIG. 1.

The solid-state imaging device 5 includes: an RGB photoelectric conversion element group including photoelectric conversion elements 51R (denoted by a character 'R' in the drawing) that detect light corresponding to R (red color), photoelectric conversion elements 51G (denoted by a character 'G' in the drawing) that detect light corresponding to G (green color), and photoelectric conversion elements 51B (denoted by a character 'B' in the drawing) that detect light corresponding to B (blue color), which are arrayed in a square lattice pattern in a row direction X and a column direction Y perpendicular to the row direction X on a silicon substrate 50; and a W photoelectric conversion element group including photoelectric conversion elements 51W (denoted by a character 'W' in the drawing) that detect a luminance component of light, which are arrayed in a square lattice pattern in the row direction X and the column direction Y perpendicular to the row direction X on the silicon substrate 50. These are arrayed at positions shifted by about ½ of an arrangement pitch of the photoelectric conversion elements in the row direction X and the column direction Y. In addition, the arrangement pitch of the photoelectric conversion elements of the RGB photoelectric conversion element group is equal to that of the photoelectric conversion elements of the W photoelectric conversion element group.

A color filter that makes R light transmitted therethrough, a color filter that makes G light transmitted therethrough, and a color filter that makes B light transmitted therethrough are provided above each photoelectric conversion element of the RGB photoelectric conversion element group, and the arrangement of the color filters is a Bayer arrangement.

A filter having a spectral characteristic correlated with information on the luminance of light, that is, a luminance filter is provided above each photoelectric conversion element of the W photoelectric conversion element group. For example, an ND filter, a transparent filter, a white filter, or a gray filter corresponds to the luminance filter. In addition, a configuration in which light is directly incident on a light receiving surface in a state where nothing is provided above the light receiving surface of a photoelectric conversion element may also be said to have the luminance filter provided.

Each photoelectric conversion element of the RGB photoelectric conversion element group has the same structure as each photoelectric conversion element of the W photoelectric conversion element group.

In the arrangement of the photoelectric conversion elements of the RGB photoelectric conversion element group, it may be said that a GR photoelectric conversion element column, which includes the photoelectric conversion element 51G and the photoelectric conversion element 51R provided in a line in the column direction Y, and a BG photoelectric conversion element column, which includes the photoelectric conversion element 51B and the photoelectric conversion element 51G provided in a line in the column direction Y, are arrayed alternately in the row direction X. In addition, in the arrangement of the photoelectric conversion elements of the RGB photoelectric conversion element group, it may also be said that a GB photoelectric conversion element row, which includes the photoelectric conversion element 51G and the photoelectric conversion element 51B provided in a line in the row direction X, and an RG photoelectric conversion element row, which includes the photoelectric conversion element 51R and the photoelectric conversion element 51G provided in a line in the row direction X, are arrayed alternately in the column direction Y.

In the arrangement of the photoelectric conversion elements of the W photoelectric conversion element group, it may be said that a plurality of W photoelectric conversion element columns, each of which is a photoelectric conversion element column including the photoelectric conversion elements 51W provided in a line in the column direction Y, are arrayed in the row direction X. In addition, in the arrangement of the photoelectric conversion elements of the W photoelectric conversion element group, it may also be said that a plurality of W photoelectric conversion element rows each including the photoelectric conversion elements 51W provided in a line in the row direction X, are arrayed in the column direction Y.

On a right side of each photoelectric conversion element column, a vertical charge transfer path 54 (only a part is shown in FIG. 2) for transmitting an electric charge generated in each photoelectric conversion element in the column direction Y is formed corresponding to each photoelectric conversion element column. The vertical charge transfer path 54 is formed by n-type impurities injected into a p-well layer formed on an n-type silicon substrate, for example.

Transfer electrodes V1 to V8 to which transfer pulses having eight phases for controlling transfer of an electric charge read to the vertical charge transfer path 54 is applied by the imaging device driving unit 10 are formed above the vertical charge transfer path 54.

The transfer electrodes V1 to V8 are disposed within the photoelectric conversion element rows, such that the transfer electrodes V1 to V8 are positioned in a zigzag manner in the row direction X in order to avoid photoelectric conversion elements included in each of the photoelectric conversion element rows.

Between the photoelectric conversion element 51G and the vertical charge transfer path 54 adjacent to a right side of the photoelectric conversion element 51G in the drawing, a charge read portion 55g for reading an electric charge, which is generated and stored in the photoelectric conversion element 51G, to the vertical charge transfer path 54 is formed corresponding to the photoelectric conversion element 51G.

Between the photoelectric conversion element 51W and the vertical charge transfer path 54 adjacent to a left side of the photoelectric conversion element 51W in the drawing, a charge read portion 55w for reading an electric charge, which is generated and stored in the photoelectric conversion element 51W, to the vertical charge transfer path 54 is formed corresponding to the photoelectric conversion element 51W.

Thus, the charge read portion 55g corresponding to the photoelectric conversion element 51G and the charge read portion 55w corresponding to each of the two photoelectric conversion elements 51W, which are adjacent to the photoelectric conversion element 51G in directions of diagonally upper right and diagonally lower right in the drawing, are adjacent to the same vertical charge transfer path 54.

Between the photoelectric conversion element 51R and the vertical charge transfer path 54 adjacent to a left side of the photoelectric conversion element 51R in the drawing, a charge read portion 55r for reading an electric charge, which is generated and stored in the photoelectric conversion element 51R, to the vertical charge transfer path 54 is formed.

Between the photoelectric conversion element 51B and the vertical charge transfer path 54 adjacent to a left side of the photoelectric conversion element 51B in the drawing, a charge read portion 55b for reading an electric charge, which is generated and stored in the photoelectric conversion element 51B, to the vertical charge transfer path 54 is formed.

The transfer electrode V4 or V8 is formed above the charge read portion 55w. By applying a read pulse to the transfer electrode V4 or V8, an electric charge generated and stored in the photoelectric conversion element 51W can be read to the vertical charge transfer path 54 positioned on the left side of the photoelectric conversion element 51W.

The transfer electrode V2 or V6 is formed above the charge read portion 55g. By applying a read pulse to the transfer electrode V2 or V6, an electric charge generated and stored in the photoelectric conversion element 51G can be read to the vertical charge transfer path 54 positioned on the right side of the photoelectric conversion element 51G.

The transfer electrode V1 is formed above the charge read portion 55r. By applying a read pulse to the transfer electrode V1, an electric charge generated and stored in the photoelectric conversion element 51R can be read to the vertical charge transfer path 54 positioned on the left side of the photoelectric conversion element 51R.

The transfer electrode V5 is formed above the charge read portion 55b. By applying a read pulse to the transfer electrode V5, an electric charge generated and stored in the photoelectric conversion element 51B can be read to the vertical charge transfer path 54 positioned on the left side of the photoelectric conversion element 51B.

A horizontal charge transfer path 57 used to transmit an electric charge, which has been transmitted through the vertical charge transfer path 54, in the row direction X is connected to the vertical charge transfer path 54. An output amplifier 58 that converts an electric charge, which has been transmitted through the horizontal charge transfer path 57, into a voltage signal and outputs the voltage signal is connected to the horizontal charge transfer path 57.

A driving method of the solid-state imaging device 5 configured in this manner will be described.

Figure 3:
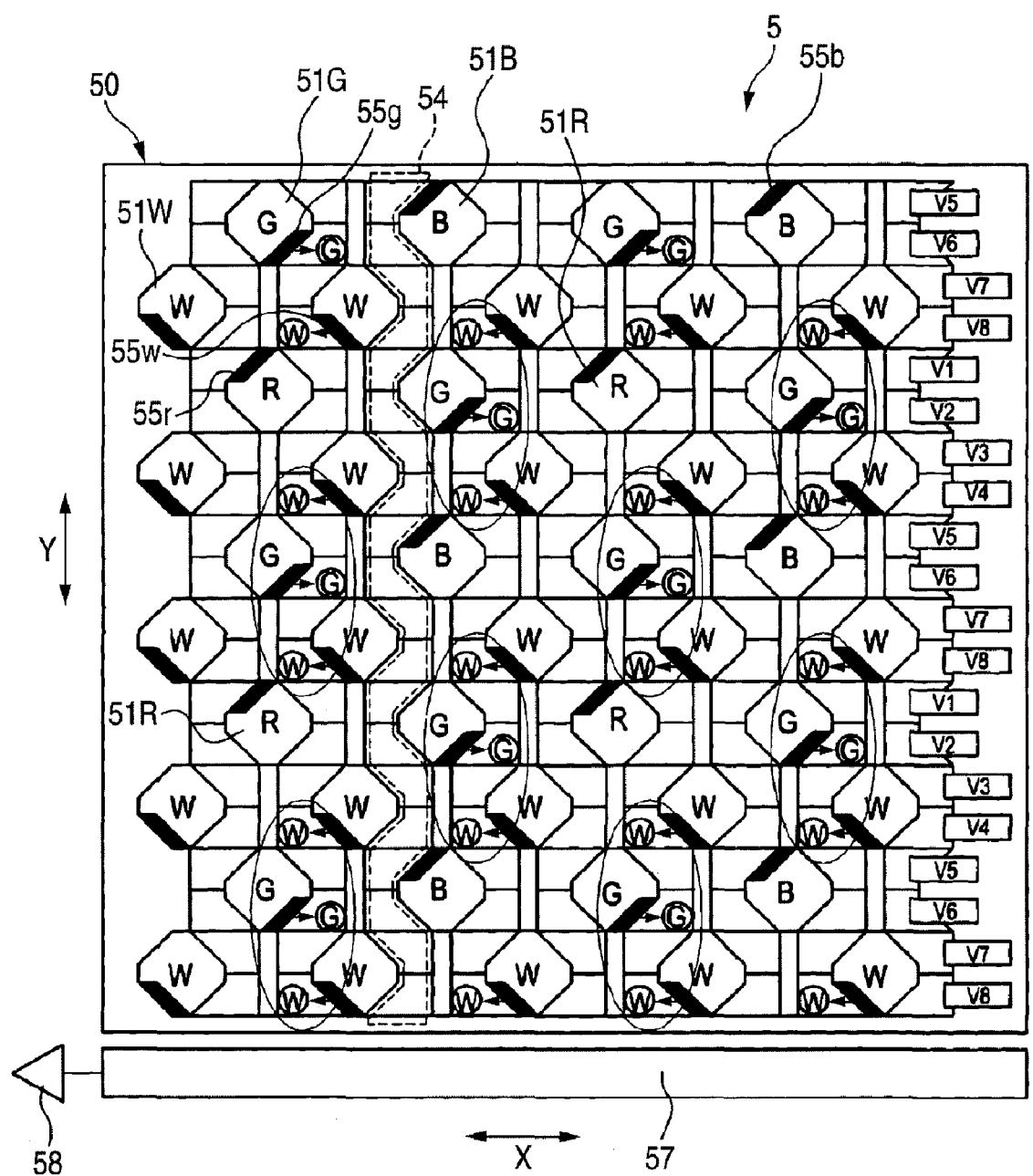
FIG. 3 is a view illustrating a charge read state at the time of preparatory photographing of the solid-state imaging device shown in FIG. 2.

After an exposure period in preparatory photographing for performing processing, such as automatic focus (AF) or automatic exposure (AE), ends, the imaging device driving unit 10 applies a read pulse to the transfer electrodes V2, V4, V6, and V8 to read an electric charge, which is stored in the photoelectric conversion element 51W, and an electric charge, which is stored in the photoelectric conversion element 51G, to the vertical charge transfer path 54. A state at this time is shown in FIG. 3. In FIG. 3, an electric charge read to the vertical charge transfer path 54 is indicated by 'O' mark, a character 'W' is given to an electric charge (hereinafter, referred to as a W electric charge) read from the photoelectric conversion element 51W, and a character 'G' is given to an electric charge (hereinafter, referred to as a G electric charge) read from the photoelectric conversion element 51G.

As shown in FIG. 3, after reading the W electric charge and the G electric charge to the vertical charge transfer path 54, the imaging device driving unit 10 controls a transfer pulse applied to the transfer electrodes V1 to V8 to mix the electric charges (G electric charge and two W electric charges positioned above and below the G electric charge) enclosed with the ellipse in the drawing on the vertical charge transfer path 54.

After mixing the electric charges, the imaging device driving unit 10 controls the transfer pulse applied to the transfer electrodes V1 to V8 to transfer an electric charge after mixing to the horizontal charge transfer path 57 and transfer the electric charge to the output amplifier 58 through the horizontal charge transfer path 57. Then, a signal corresponding to the electric charge is output from the output amplifier 58, and the preparatory photographing operation is ended.

After the preparatory photographing ends, the system control unit 11 determines a photographing condition by performing AF and AE on the basis of an imaging signal obtained from the solid-state imaging device 5. Then, when a photographing instruction is made from a user, present photographing is performed in the determined photographing condition.

Figure 4:
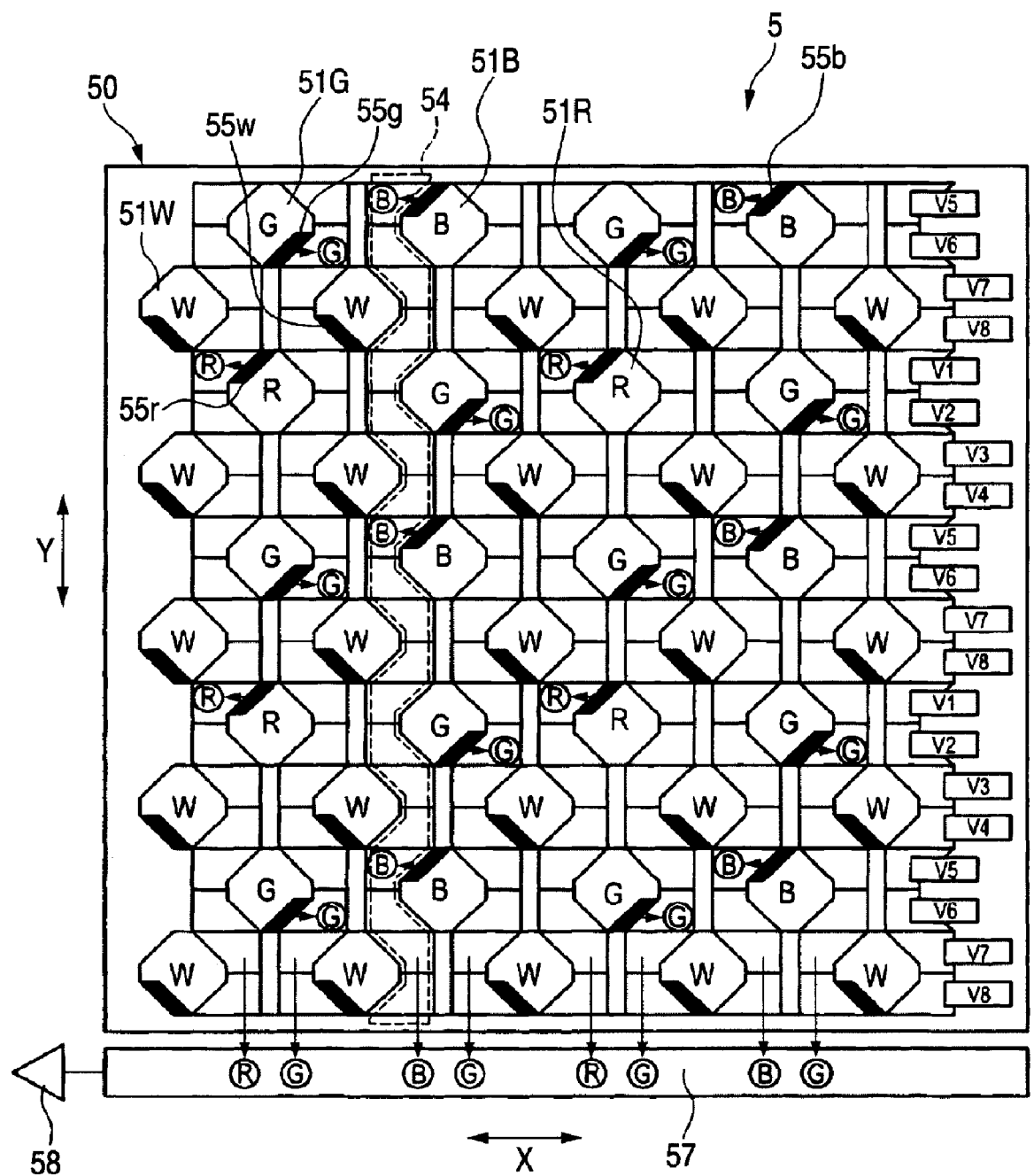
FIG. 4 is a view illustrating a charge read state at the time of present photographing of the solid-state imaging device shown in FIG. 2.

After an exposure period in the present photographing ends, the imaging device driving unit 10 applies a read pulse to the transfer electrodes V1, V2, V5, and V6 to read an electric charge stored in the photoelectric conversion element 51R, an electric charge stored in the photoelectric conversion element 51G, and an electric charge stored in the photoelectric conversion element 51B to the vertical charge transfer path 54. A state at this time is shown in FIG. 4. In FIG. 4, an electric charge read to the vertical charge transfer path 54 is indicated by 'O' mark, a character 'R' is given to an electric charge (hereinafter, referred to as an R electric charge) read from the photoelectric conversion element 51R, a character 'G' is given to an electric charge (hereinafter, referred to as a G electric charge) read from the photoelectric conversion element 51G, and a character 'B' is given to an electric charge (hereinafter, referred to as a B electric charge) read from the photoelectric conversion element 51B.

As shown in FIG. 4, after reading the R, G, and B electric charges to the vertical charge transfer path 54, the imaging device driving unit 10 transfers the electric charges to the horizontal charge transfer path 57, transfers the electric charges to the output amplifier 58 through the horizontal charge transfer path 57, and makes a signal corresponding to the electric charges output from the output amplifier 58 by controlling the transfer pulse applied to the transfer electrodes V1 to V8.

Then, the imaging device driving unit 10 applies a read pulse to the transfer electrodes V4 and V8 to read the W electric charge stored in the photoelectric conversion element 51W to the vertical charge transfer path 54. Then, the imaging device driving unit 10 transfers the W electric charge to the horizontal charge transfer path 57, transfers the W electric charge to the output amplifier 58 through the horizontal charge transfer path 57, and makes a signal corresponding to the W electric charge output from the output amplifier 58 by controlling the transfer pulse applied to the transfer electrodes V1 to V8.

Signals from all photoelectric conversion elements that form the solid-state imaging device 5 can be acquired by performing such driving.

As described above, according to the solid-state imaging device 5 of the present embodiment, only the G electric charge and the W electric charge can be read and the G electric charge and the W electric charge adjacent to the G electric charge can be mixed to be transmitted at the time of preparatory photographing. Since it is sufficient to have information on the luminance of a photographic subject in order to perform AE and AF, a time taken until the AE and the AF are performed can be shortened by adopting the driving method described above. Moreover, since the G electric charge and the W electric charge are mixed, a level of an imaging signal can be raised. As a result, sufficient luminance information can also be acquired in a low-luminance region, and a search range of the AE and the AF can be extended.

In addition, three kinds of vertical charge transfer paths 54 including the vertical charge transfer path 54 to which only the charge read portion 55*r* is adjacent, the vertical charge transfer path 54 to which only the charge read portion 55*b* is adjacent, and the vertical charge transfer path 54 to which the charge read portion 55*g* and the charge read portion 55*w* are adjacent are present in the solid-state imaging device according to the present embodiment. Therefore, when electric charges other than the W electric charge are read and electric charges for one line are transmitted to the horizontal charge transfer path 57, the sequence of the electric charges for one line becomes RGBGRGBG . . . , as shown in FIG. 4. That is, since signals corresponding to three primary colors can be output from the horizontal charge transfer path 57 during one horizontal transfer period, color image processing can be performed in real time and a time taken from photographing to recording can be shortened.

Furthermore, according to the solid-state imaging device of the present embodiment, only electric charges corresponding to the same color component can be read to one vertical charge transfer path 54 at the time of the present photographing. Therefore, since it can be prevented that electric charges corresponding to different color components are mixed during transfer on the vertical charge transfer path 54, the quality of an image can be improved. Furthermore, since only electric charges corresponding to the same color component are read to the vertical charge transfer path 54, mixing of electric charges on the vertical charge transfer path 54 can also be realized by simple driving without performing complicated driving.

Second Embodiment

In the first embodiment, an example in which the solid-state imaging device 5 is a charge transfer type device was described. The invention may also be applied to a case where the solid-state imaging device 5 is of a MOS type, and the configuration in this case will be described.

The arrangement of photoelectric conversion elements of the solid-state imaging device according to the present embodiment is the same as that shown in FIG. 2. A charge storage portion that temporarily stores electric charges generated and stored in each photoelectric conversion element and a signal output circuit, which is formed by a MOS transistor and converts the electric charges stored in the charge storage portion into a signal and outputs the signal, are provided on a semiconductor substrate instead of the vertical charge transfer path 54, the horizontal charge transfer path 57, the output amplifier 58, and the transfer electrodes V1 to V8.

Figure 5:
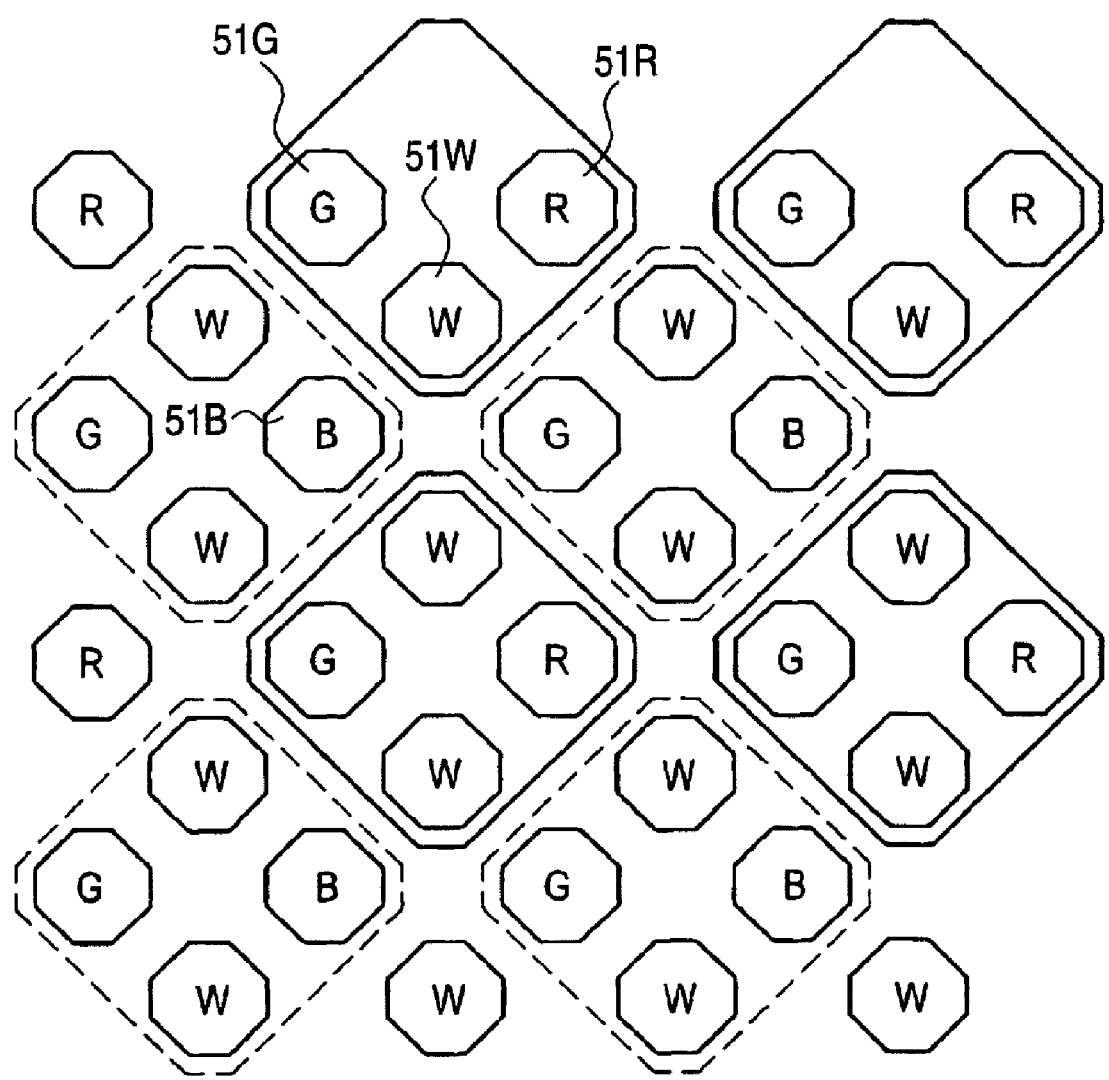
FIG. 5 is a plan view illustrating the schematic configuration of a solid-state imaging device according to a second embodiment of the invention.

FIG. 5 is a plan view illustrating the schematic configuration of a solid-state imaging device according to a second embodiment of the invention.

In FIG. 5, the same components as in FIG. 2 are denoted by the same reference numerals. In the solid-state imaging device shown in FIG. 5, a charge storage portion and a signal output circuit are shared for every four photoelectric conversion elements enclosed by a large solid frame and a large dotted frame in the drawing.

Figure 6:
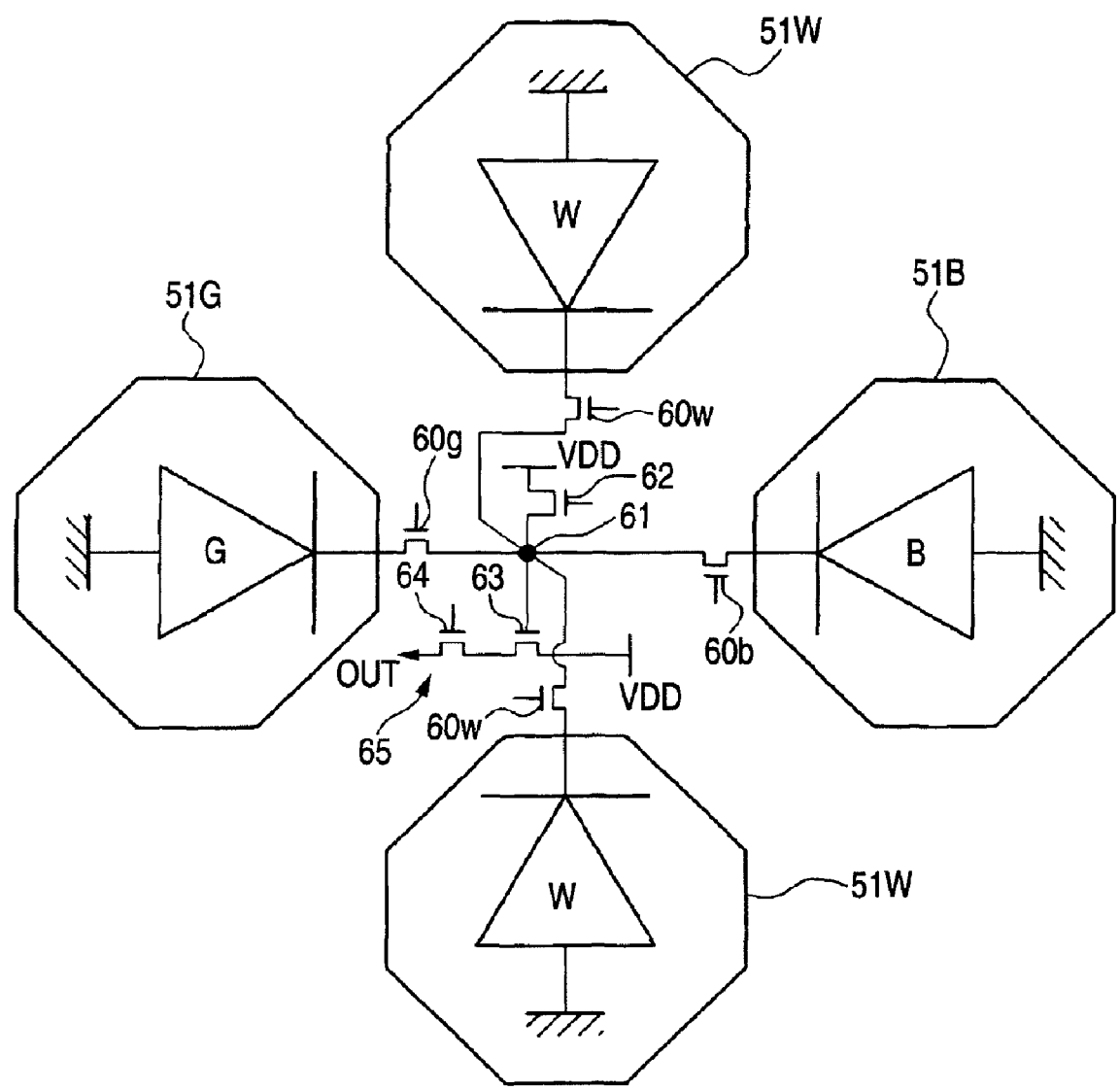
FIG. 6 is an enlarged view illustrating the inside of a large dotted frame shown in FIG. 5.

FIG. 6 is an enlarged view illustrating the inside of the large dotted frame shown in FIG. 5.

As shown in FIG. 6, in a middle portion surrounded by four photoelectric conversion elements including two photoelectric conversion elements 51W, a photoelectric conversion elements 51G, and a photoelectric conversion elements 51B, a charge storage portion (floating diffusion) 61 for temporarily storing electric charges generated and stored in each of the four photoelectric conversion elements and a signal output circuit 65 that converts the electric charges stored in the charge storage portion 61 into a signal and outputs the signal are formed.

Each of the two photoelectric conversion elements 51W is connected to the charge storage portion 61 with a MOS transistor 60w interposed therebetween. The MOS transistor 60w functions as a unit for controlling transfer of electric charges, which are stored in the photoelectric conversion element 51W, to the charge storage portion 61 by controlling a voltage applied to its gate.

The photoelectric conversion element 51G is connected to the charge storage portion 61 with a MOS transistor 60g interposed therebetween. The MOS transistor 60g functions as a unit for controlling transfer of electric charges, which are stored in the photoelectric conversion element 51G, to the charge storage portion 61 by controlling a voltage applied to its gate.

The photoelectric conversion element 51B is connected to the charge storage portion 61 with a MOS transistor 60b interposed therebetween. The MOS transistor 60b functions as a unit for controlling transfer of electric charges, which are stored in the photoelectric conversion element 51B, to the charge storage portion 61 by controlling a voltage applied to its gate.

The signal output circuit 65 has a known three-transistor configuration including: a reset transistor 62 which is connected to the charge storage portion 61 and which is a MOS transistor for resetting an electric charge stored in the charge storage portion 61; an output transistor 63 which is connected to the charge storage portion 61 and which converts an electric charge stored in the charge storage portion 61 to a signal and outputs the signal; and a selection transistor 64 which is connected to the output transistor 63 and which is a MOS transistor that makes a control of outputting the signal converted by the output transistor 63 to a signal output line.

Figure 7:
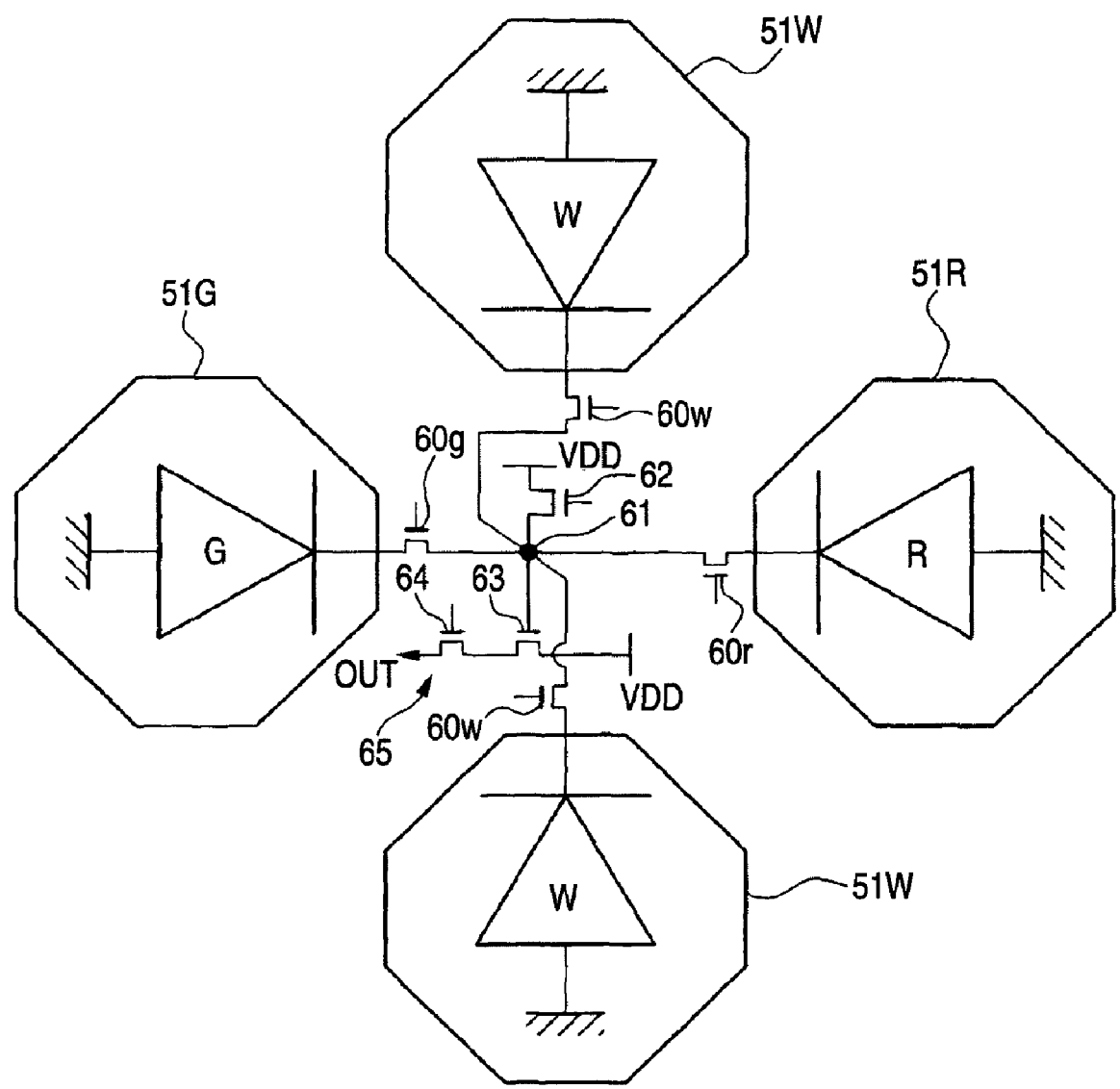
FIG. 7 is an enlarged view illustrating the inside of a large solid frame shown in FIG. 5.

FIG. 7 is an enlarged view illustrating the inside of the large solid frame shown in FIG. 5.

In FIG. 7, the photoelectric conversion element 51B shown in FIG. 6 is changed to the photoelectric conversion element 51R, and the MOS transistor 60b is changed to a MOS transistor 60r. The MOS transistor 60r functions as a unit for controlling transfer of electric charges, which are stored in the photoelectric conversion element 51R, to the charge storage portion 61 by controlling a voltage applied to its gate.

Hereinafter, a driving method of the solid-state imaging device configured in this manner will be described.

After an exposure period in preparatory photographing for performing processing, such as AF or AE, ends, the imaging device driving unit 10 turns on the MOS transistor 60w to transfer an electric charge stored in the photoelectric conversion element 51W to the charge storage portion 61 and turns on the MOS transistor 60g to transfer an electric charge stored in the photoelectric conversion element 51G to the charge storage portion 61. Then, in the charge storage portion 61, the electric charge generated in the photoelectric conversion element 51W and the electric charge generated in the photoelectric conversion element 51G are mixed. In addition, charge transfer from each of the two photoelectric conversion elements 51W and photoelectric conversion elements 51G, which exist in the large frame shown in FIG. 5, to the charge storage portion 61 may be performed simultaneously or may be performed with a time difference.

Then, the imaging device driving unit 10 turns on the selection transistor 64 in each of the large frames shown in FIG. 5 in a sequential manner and outputs a signal converted by the output transistor 63 connected to the selection transistor 64 that is turned on, completing the preparatory photographing. By performing such driving, a luminance signal corresponding to the position of each large frame in FIG. 5 can be acquired.

As described above, also in a MOS type solid-state imaging device, a luminance signal for AE and AF can be acquired at high speed and sufficient luminance information can be acquired in a low-luminance region by performing mixing of electric charges in a condition where the charge storage portion is shared.

In addition, although the charge storage portion and the signal output circuit are shared between the photoelectric conversion element 51R and the photoelectric conversion element 51B in the present embodiment, the charge storage portion and the signal output circuit connected to the photoelectric conversion element 51R or the photoelectric conversion element 51B may also be provided independently.

Furthermore, in the present embodiment, the charge storage portion and the signal output circuit are shared in the large frame shown in FIG. 5. However, the example of sharing is only an example, and the charge storage portion and the signal output circuit may also be configured to be shared between the photoelectric conversion element 51G and the photoelectric conversion element 51G adjacent to the photoelectric conversion element 51G in a predetermined direction. For example, the charge storage portion and the signal output circuit may be shared among the photoelectric conversion element 51G and the four photoelectric conversion elements 51W adjacent to the photoelectric conversion element 51G in up and down directions of the photoelectric conversion element 51G, or may be shared among the photoelectric conversion element 51G and the two photoelectric conversion elements 51W adjacent to the photoelectric conversion element 51G in the upper or lower direction of the photoelectric conversion element 51G.

Although the invention has been described above in relation to preferred embodiments and modifications thereof, it will be understood by those skilled in the art that other variations and modifications can be effected in these preferred embodiments without departing from the scope and spirit of the invention.

What is claimed is:
1. A driving method of a solid-state imaging device comprising a plurality of photoelectric conversion elements,
   wherein the plurality of photoelectric conversion elements comprise a first photoelectric conversion element group arrayed in a square lattice pattern in a row direction and a column direction perpendicular to the row direction and a second photoelectric conversion element group arrayed in a square lattice pattern in the row direction and the column direction, the first photoelectric conversion element group and the second photoelectric conversion element group are disposed to be shifted from each other by ½ of an arrangement pitch of the photoelectric conversion elements in the row direction and the column direction, the first photoelectric conversion element group comprises a first photoelectric conversion element in which a color filter that makes a green light transmitted therethrough is provided above the first photoelectric conversion element, a second photoelectric conversion element in which a color filter that makes other light transmitted therethrough is provided above the second photoelectric conversion element, and a third photoelectric conversion element in which a color filter that makes other light transmitted therethrough is provided above the third photoelectric conversion element, and the second photoelectric conversion element group comprises photoelectric conversion elements for luminance detection in which a luminance filter having a spectral characteristic correlated with information on a luminance of light is provided above the photoelectric conversion element for luminance detection, the driving method comprising: performing first driving which mixes a first electric charge generated in the first photoelectric conversion element with a second electric charge generated in the photoelectric conversion element for luminance detection, converts the electric charges obtained by the mixing into a signal, and outputs the signal, wherein the solid-state imaging device comprises a charge storage portion, which is provided corresponding to each of the plurality of photoelectric conversion elements and temporarily stores an electric charge generated in each of the plurality of photoelectric conversion elements, and a signal output circuit formed of a MOS transistor that outputs a signal corresponding to the electric charge stored in the charge storage portion, the charge storage portion corresponding to the first photoelectric conversion element and the charge storage portion corresponding to the photoelectric conversion element for luminance detection adjacent to the first photoelectric conversion element are shared, the solid-state imaging device comprises a first transfer control unit for controlling transfer of an electric charge from the first photoelectric conversion element to the charge storage portion and a second transfer control unit for controlling transfer of an electric charge from the photoelectric conversion element for luminance detection to the charge storage portion, and the first driving transfers an electric charge from the first photoelectric conversion element to the charge storage portion by controlling the first transfer control unit, transfers an electric charge from the photoelectric conversion element for luminance detection to the charge storage portion by controlling the second transfer control unit, mixes the electric charges in the charge storage portion, and outputs a signal corresponding to the mixed electric charges from the signal output circuit.

2. An imaging apparatus comprising a solid-state imaging device comprising a plurality of photoelectric conversion elements, wherein the plurality of photoelectric conversion elements comprise a first photoelectric conversion element group arrayed in a square lattice pattern in a row direction and a column direction perpendicular to the row direction and a second photoelectric conversion element group arrayed in a square lattice pattern in the row direction and the column direction, the first photoelectric conversion element group and the second photoelectric conversion element group are disposed to be shifted from each other by ½ of an arrangement pitch of the photoelectric conversion elements in the row direction and the column direction, the first photoelectric conversion element group comprises a first photoelectric conversion element in which a color filter that makes a green light transmitted therethrough is provided above the first photoelectric conversion element, a second photoelectric conversion element in which a color filter that makes other light transmitted therethrough is provided above the second photoelectric conversion element, and a third photoelectric conversion element in which a color filter that makes other light transmitted therethrough is provided above the third photoelectric conversion element, the second photoelectric conversion element group comprises photoelectric conversion elements for luminance detection in which a luminance filter having a spectral characteristic correlated with information on the luminance of light is provided above the photoelectric conversion element for luminance detection, the imaging apparatus comprising:

a first driving unit for performing a first driving which mixes a first electric charge generated in the first photoelectric conversion element with a second electric charge generated in the photoelectric conversion element for luminance detection, converts the electric charges obtained by the mixing into a signal, and outputs the signal, wherein the solid-state imaging device comprises a charge storage portion, which is provided corresponding to each of the plurality of photoelectric conversion elements and temporarily stores an electric charge generated in each of the plurality of photoelectric conversion elements, and a signal output circuit formed of a MOS transistor that outputs a signal corresponding to the electric charge stored in the charge storage portion, the charge storage portion corresponding to the first photoelectric conversion element and the charge storage portion corresponding to the photoelectric conversion element for luminance detection adjacent to the first photoelectric conversion element are shared, the solid-state imaging device comprises a first transfer control unit for controlling transfer of an electric charge from the first photoelectric conversion element to the charge storage portion and a second transfer control unit for controlling transfer of an electric charge from the photoelectric conversion element for luminance detection to the charge storage portion, and the first driving transfers an electric charge from the first photoelectric conversion element to the charge storage portion by controlling the first transfer control unit, transfers an electric charge from the photoelectric conversion element for luminance detection to the charge storage portion by controlling the second transfer control unit, mixes the electric charges in the charge storage portion, and outputs a signal corresponding to the mixed electric charges from the signal output circuit.

* * * * *